United States Patent
Ono

(10) Patent No.: US 8,954,043 B2
(45) Date of Patent: Feb. 10, 2015

(54) COMMUNICATION TERMINAL

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 12/597,466

(22) PCT Filed: May 9, 2008

(86) PCT No.: PCT/JP2008/058983
§ 371 (c)(1),
(2), (4) Date: Oct. 23, 2009

(87) PCT Pub. No.: WO2009/001628
PCT Pub. Date: Dec. 31, 2008

(65) Prior Publication Data
US 2010/0093327 A1    Apr. 15, 2010

(30) Foreign Application Priority Data

Jun. 26, 2007    (JP) .................................. 2007-167459

(51) Int. Cl.
*H04M 3/42*    (2006.01)
*H04M 1/2745*    (2006.01)
(Continued)

(52) U.S. Cl.
CPC ...... *H04M 1/2745* (2013.01); *H04M 1/274508* (2013.01); *H04M 1/274533* (2013.01); *H04M 1/67* (2013.01); *H04M 2250/14* (2013.01); *H04M 2250/60* (2013.01)
USPC ...................................... 455/414.2; 235/380

(58) Field of Classification Search
CPC .................................................. H04W 60/00
USPC ...................................................... 455/414.2
See application file for complete search history.

(56) References Cited

U.S. PATENT DOCUMENTS 5,987,325 A * 11/1999 Tayloe ....................... 455/435.2
2007/0250579 A1* 10/2007 Caspi et al. ................... 709/206

FOREIGN PATENT DOCUMENTS

CN    1518321 A    8/2008
GB    2269512 A    2/1994
(Continued)

OTHER PUBLICATIONS

Lightheartedness with dual sim dual standby—Test of OKWAP C150, brontteus, http://bible.younet.com/files/2007/06/10/374139.shtml, http://bible.younet.com/files/2007/06/10/374139_1.shtml.
(Continued)

*Primary Examiner* — Kent Chang
*Assistant Examiner* — Chayce Bibbee
(74) *Attorney, Agent, or Firm* — Cowan, Liebowitz & Latman, P.C.

(57) ABSTRACT

There is provided a communication terminal comprising: a readout unit which reads out, from a plurality of storage media each storing an identifier concerning a communication carrier, the identifiers; a communication unit which determines the communication carriers based on the identifiers read out by the readout unit, and performs communication using the determined communication carriers; a generation unit which generates address book information in which identifying information for identifying an address of a communication partner is registered in association with carrier information concerning a communication carrier of the communication partner; and a control unit which controls the communication unit to perform communication with the communication partner based on the identifying information and the carrier information registered in the address book information.

17 Claims, 21 Drawing Sheets

(51) Int. Cl.
*G06K 5/00* (2006.01)
*H04M 1/67* (2006.01)

(56) References Cited

FOREIGN PATENT DOCUMENTS

| JP | 2001-127850 A | 5/2001 |
|---|---|---|
| JP | 2002-291043 A | 10/2002 |
| JP | 2003-189361 A | 7/2003 |
| JP | 2005-176101 A | 6/2005 |

OTHER PUBLICATIONS

May 16, 2012 Chinese Office Action, that issued in Chinese Patent Application No. 200880022414.7.
Oct. 2, 2012 Japanese Office Action, that issued in Japanese Patent Application No. 2007-167459.
May 23, 2013 Chinese Office Action, that issued in Chinese Patent Application No. 200880022414.7.

* cited by examiner

F I G. 2
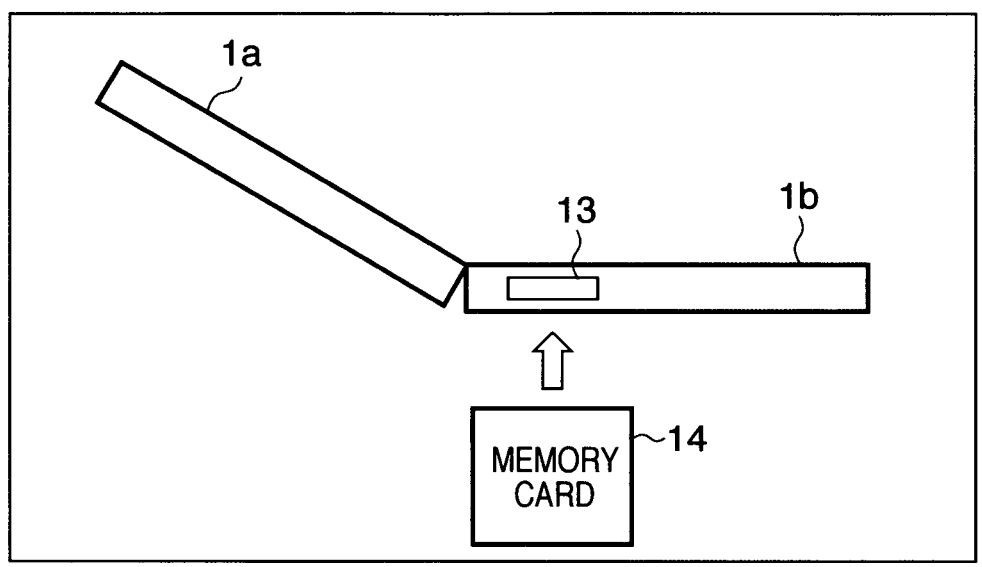

FIG. 5

| | |
|---|---|
| IC CARD ID | ~501 |
| INTERNATIONAL MOBILE SUBSCRIBER IDENTITY | ~502 |
|     MOBILE COUNTRY CODE | ~503 |
|     MOBILE NETWORK CODE | ~504 |
|     MOBILE SUBSCRIBER IDENTIFICATION NUMBER | ~505 |
| AUTHENTICATION KEY VALUE | ~506 |
| PIN CODE | ~507 |
|     PIN CODE 1 | ~508 |
|     PIN CODE 2 | ~509 |
| TELEPHONE DIRECTORY | ~510 |
|     FIXED DIALING TELEPHONE DIRECTORY | ~511 |
| EMAIL | ~512 |
| RESERVE | ~513 |

F I G. 9

| NAME | PHONE NUMBER 1 | PHONE NUMBER 2 | PHONE NUMBER 3 | CARRIER | ADD. INFO. |
|---|---|---|---|---|---|
| ○○○○ | xxxxxxxxxx |  |  | B |  |
| □□□□ | nnnnnnnnnn |  |  |  |  |

FIG. 17

| NAME | PHONE NUMBER 1 | PHONE NUMBER 2 | CARRIER 1 | CARRIER 2 | DEFAULT CARRIER | ADD. INFO. |
|---|---|---|---|---|---|---|
| ○○○○ | xxxxxxxx | | B | | | |
| □□□ | nnnnnnnn | | | | | |
| △△△△ | yyyyyyyy | zzzzzzzz | C | D | C | |

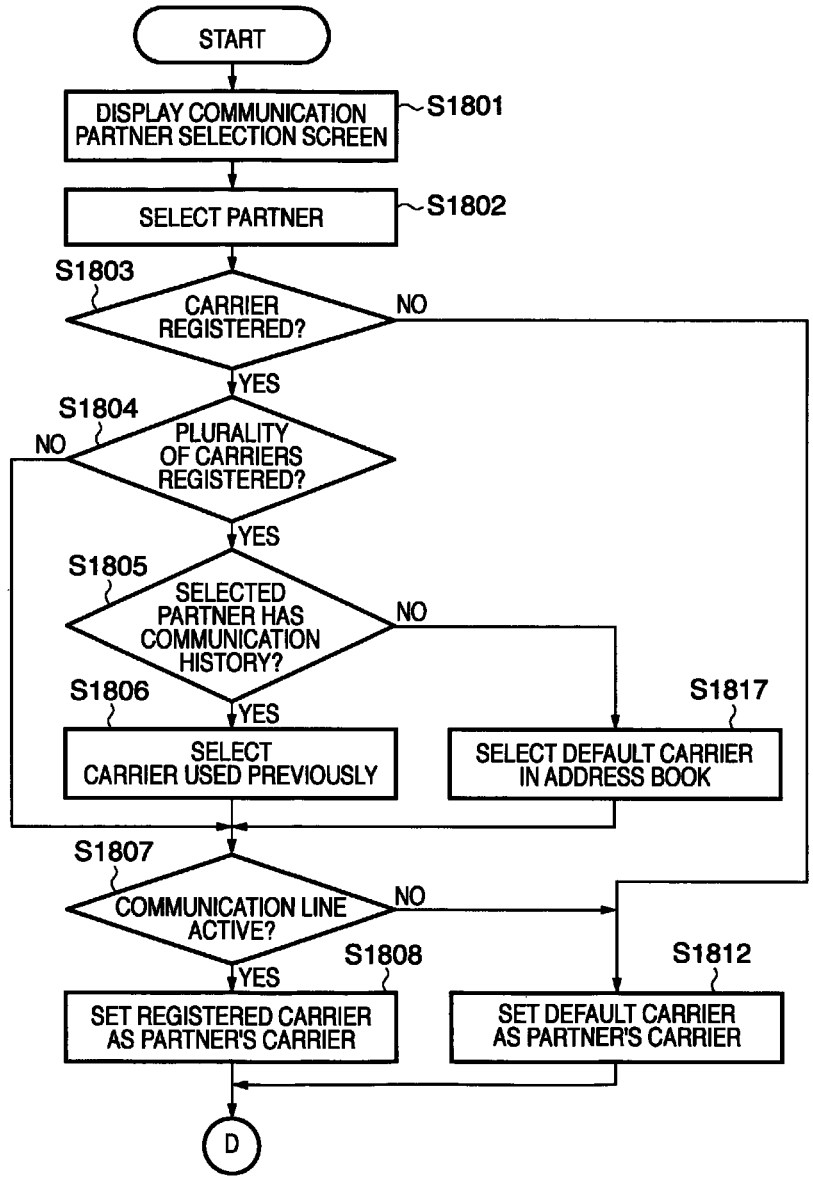
F I G. 18A

FIG. 19

| NAME | PHONE NUMBER | TIME | CALL CARRIER |
|---|---|---|---|
| ▼▼▼▼▼ | TTTTTTTTT | YY / MM / DD / TT | CARRIER A |
| □□□□□ | NNNNNNNNNN | YY / MM / DD / TT | CARRIER B |
|  | MMMMMMMMM | YY / MM / DD / TT | CARRIER B |
| ▼▼▼▼▼ | TTTTTTTTT | YY / MM / DD / TT | CARRIER A |
| ▼▼▼▼▼ | TTTTTTTTT | YY / MM / DD / TT | CARRIER A |
| ○○○○○ | SSSSSSSSS | YY / MM / DD / TT | CARRIER A |
|  | FFFFFFFFF | YY / MM / DD / TT | CARRIER B |
| □□□□□ | NNNNNNNNNN | YY / MM / DD / TT | CARRIER B |

COMMUNICATION TERMINAL

TECHNICAL FIELD

The present invention relates to a communication terminal, and more particularly to an apparatus that performs communication using a plurality of communication carriers.

BACKGROUND ART

Conventionally, mobile telephones are a known form of mobile communication terminal. With mobile phones, in particular, IMT-2000 mobile phones perform communication using an IC card called a SIM (Subscriber Identity Module) card.

Each SIM card stores a subscriber identifier such as a telephone (subscriber) number or a carrier (contracted company and the communication scheme thereof) for every line contract. When a user makes contract with a carrier, the user is provided with a SIM card. Mounting this SIM card in a phone and reading out an identifier from the SIM card enables calls to be made and taken. Also, interchanging the SIM card for mounting in a phone enables a plurality of phones to be used for different purposes using a single contracted line.

In the case where a single user contracts a plurality of communication lines, SIM cards storing an identifier for every contract are provided. Therefore, interchanging the SIM cards for mounting in a phone enables a plurality of lines to be used for different purposes with the one phone. For example, a plurality of lines can alternatively be used for business and private purposes.

A phone capable of mounting two SIM cards has also been proposed (e.g., see Japanese Patent Application Laid-Open No. 2003-189361). Therefore, mounting the two SIM cards provided as a result of a user contracting two different carriers enables calls to be made using these two carriers with the one phone.

If only one line is used, only functions and operation screens tailored to the contracted line need be displayed.

However, in the case of a phone capable of using a plurality of lines, the user needs to designate the carrier to be used when the user makes a call.

Therefore, the user needs to designate the carrier to be used every time they make a call, which is cumbersome, thus problematic

DISCLOSURE OF INVENTION

It is the feature of the present invention to solve problems like the above, and to provide an apparatus that enables selection of the communication carrier to be used with a simple operation, even in the case where a plurality of carriers are utilized.

According to an aspect of the present invention, there is provided a communication terminal comprising: a readout unit which reads out, from a plurality of storage media each storing an identifier concerning a communication carrier, the identifiers; a communication unit which determines the communication carriers based on the identifiers read out by the readout unit, and performs communication using the determined communication carriers; a generation unit which generates address book information in which identifying information for identifying an address of a communication partner is registered in association with carrier information concerning a communication carrier of the communication partner; and a control unit which controls the communication unit to perform communication with the communication partner based on the identifying information and the carrier information registered in the address book information.

Further features of the present invention will become apparent from the following description of exemplary embodiments with reference to the attached drawings.

BRIEF DESCRIPTION OF DRAWINGS

FIG. 2 is an external view of the mobile telephone in the embodiment of the present invention.

FIGS. 4A and 4B are flowcharts showing processing when the mobile telephone is powered on.

FIG. 5 shows information stored on a SIM card.

FIG. 9 shows address book information.

FIG. 17 shows address book information.

FIGS. 18A and 18B are flowcharts showing an outgoing call process using the address book.

FIG. 19 shows communication history information.

BEST MODE FOR CARRYING OUT THE INVENTION

Embodiment 1

Hereinafter, embodiments according to the present invention will be described in detail in accordance with the accompanying drawings.

Figure 1:
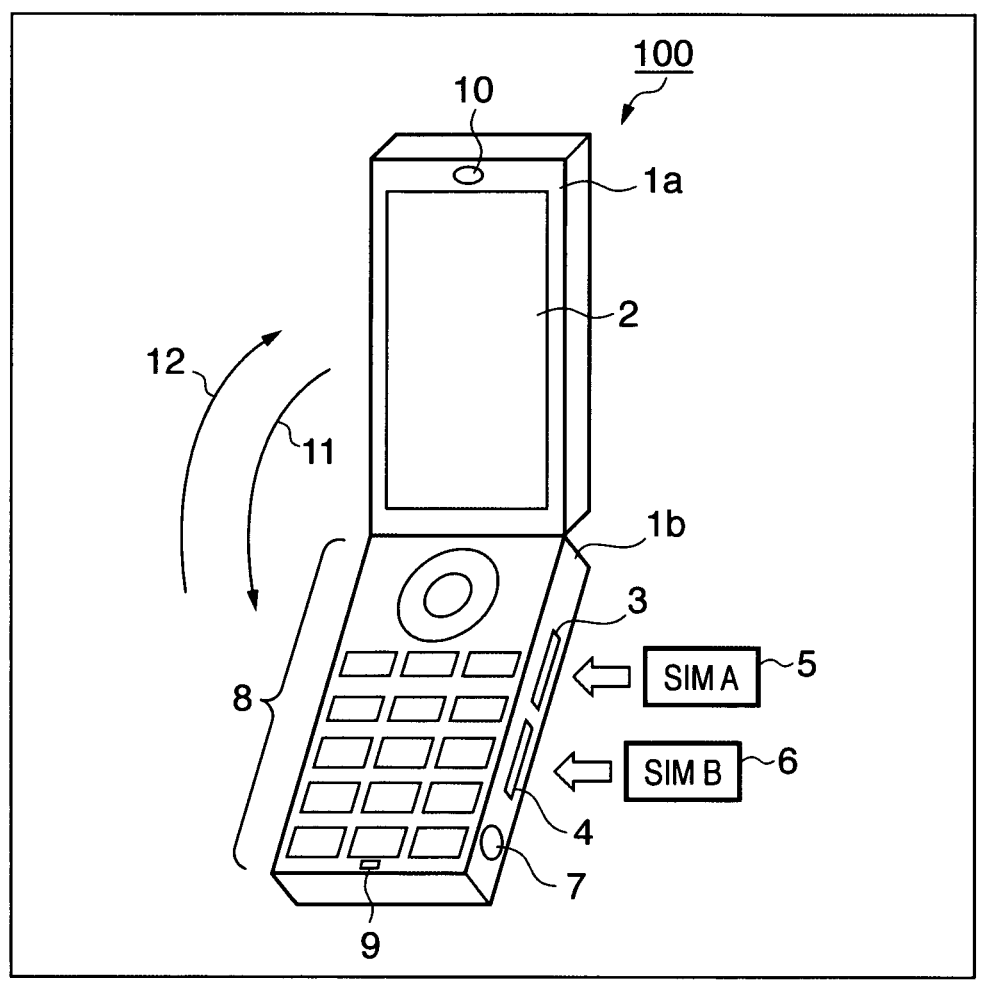
FIG. 1 is an external view of a mobile telephone in an embodiment of the present invention.

FIG. 1 shows an external configuration of a mobile telephone constituting an embodiment of the present invention.

The mobile telephone 100 (hereinafter "phone") in FIG. 1 is capable of communication using a plurality of communication schemes. In the present embodiment, the phone 100 is capable of communication using W-CDMA and CDMA2000. Of course, communication schemes other than these may be used, and communication using three or more communication schemes can also be made possible.

Apart from a voice communication function, the phone 100 has a multimedia function for video conferencing or the like, an email sending/receiving function, and a WEB browser function. Further, the mobile phone 100 has an address book function, an electronic organizer function, a function for downloading and using games and other applications, a navigation function, and a music playback function.

Casings 1a and 1b of the phone 100 are assumed to incorporate an antenna and a vibrator that vibrates the phone when there is an incoming call or the like. A liquid crystal display unit (LCD) 2 is provided in the casing 1a. A speaker 10 is disposed above the display unit 2.

Two SIM slots 3 and 4 for mounting SIM cards are provided in the phone 100. Different SIM cards 5 and 6 can be mounted in these SIM slots 3 and 4. The SIM cards 5 and 6 can each be freely removed.

A microphone 9 for inputting voice during a telephone conversation is disposed at the very bottom of the casing 1*b*, and a key operation unit 8 for operation inputs related to various functions in addition to the talk function is provided on a lower portion of the casing 1*b*. A line change button 7 used as a switching button for activating the contracted line of a SIM card mounted in one of the SIM slots 3 and 4 is disposed on a side face of the casing 1*b*.

The casings 1*a* and 1*b* of the phone 100 can be rotated in the direction of arrow 11 or 12. The phone 100 can be closed by rotating the casing 1*a* in the direction of arrow 11 when the phone 100 is open. The display unit 2 is on the inside of the phone when the phone 100 is closed. The phone 100 can be opened by rotating the casing 1*a* in the direction of arrow 12 when the phone 100 is closed.

The user is able to use various functions by operating the key operation unit 8 with the phone 100 open. Incoming call and email operations can also be performed with the phone 100 closed.

FIG. 2 shows the phone 100 from the left side. As shown in FIG. 2, the phone 100 is provided with a memory card slot 13 for mounting a memory card 14. Data and the like for executing various functions used on the phone 100 can be stored in the memory card 14.

Figure 3:
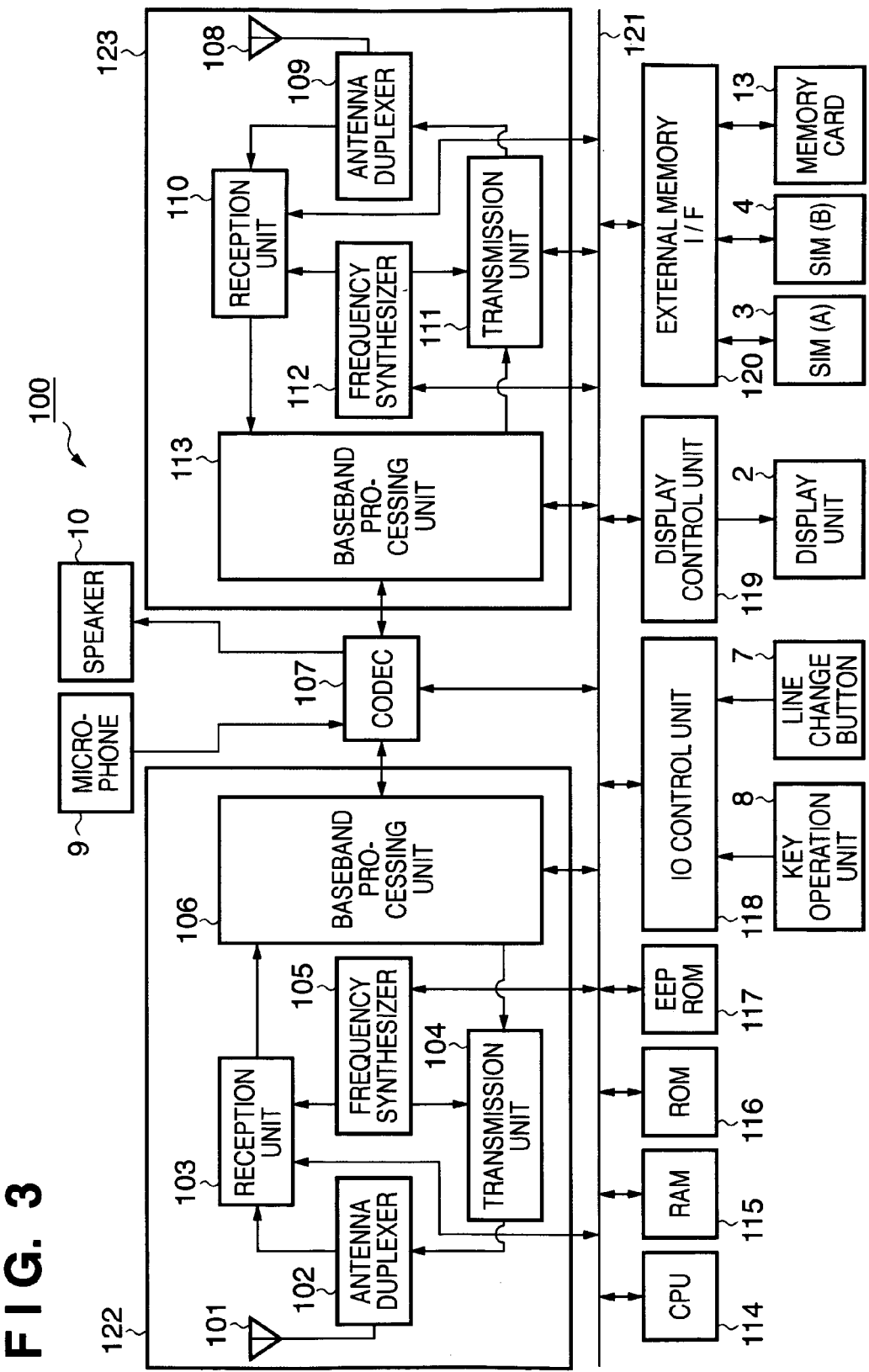
FIG. 3 is a block diagram showing a configuration of the mobile telephone in the embodiment of the present invention.

FIG. 3 is a block diagram showing an internal configuration of the phone 100 in FIG. 1. Note that the block diagram of FIG. 3 primarily illustrates only the blocks required for the talk function and the email sending/receiving function. As aforementioned, the phone 100 has various other functions apart from the talk function and the email sending/receiving function, although because known configurations are used for these functions, related blocks and detailed descriptions thereof will be omitted.

In FIG. 3, the various operations of the phone 100 are controlled by a CPU 114. The CPU 114 controls the units via a CPU bus 121. A RAM 115 and a ROM 116 for storing data and computer programs, and an EEPROM 117 that constitutes a nonvolatile memory capable of holding data even if the phone is powered off are connected to the CPU bus 121. Note that a rewritable NAND flash memory or NOR flash memory may be used instead of the EEPROM.

The CPU 114 receives key inputs from the key operation unit 8 and key inputs from the line change button 7 via an input/output (IO) control unit 118, and performs controls to illuminate the buttons of the key operation unit 8. The CPU 114 also displays various images and information on the display unit 2 by controlling a display control unit 119.

The CPU 114 reads information from SIM cards mounted in the SIM slot 3 (SIM slot A) and the SIM slot 4 (SIM slot B) via an external memory interface (I/F) 120. Further, the CPU 114 executes data writing and reading on a mounted memory card via the memory card slot 13.

The phone 100 is provided with a W-CDMA (first communication scheme) communication unit 122 and a CDMA2000 (second communication scheme) communication unit 123. The phone 100 performs communication after selecting the communication unit 122 or the communication unit 123 in accordance with subscriber information read from the mounted SIM card 5 or 6, as will be discussed below.

Firstly, basic call/email reception and transmission processing in the phone 100 will be described.

Here, processing by the first communication unit 122 when an incoming call or email is received will be described as an example.

A wireless signal sent from a base station (not shown) is received by an antenna 101, and the received signal is input to a reception unit 103 via an antenna duplexer 102. The reception unit 103 is provided with a high frequency amplifier, a frequency converter, and a demodulator. After low-noise amplifying the received signal with a low noise amplifier, the reception unit 103 frequency converts the low-noise amplified signal to a reception intermediate frequency signal or a reception baseband signal by synthesizing the low-noise amplified signal with a receiver local oscillator signal produced by a frequency synthesizer 105. The reception unit 103 then demodulates the frequency converted signal with the demodulator.

The demodulated signal is sent to a baseband processing unit 106, and separated into voice signal and email data. The voice data is decoded by a codec 107 in accordance with the communication scheme, and output to the speaker 10.

On the other hand, email data is sent to the RAM 115 and saved. The user is able to arbitrarily read out email data saved to the RAM 115 and display the read email data on the display unit 2 by operating the key operation unit 8.

When there is an incoming call, the voice of the communication partner is thus output from the speaker 10.

On the other hand, in the case of transmitting voice during a telephone conversation, the voice signal of the user output from the microphone 9 is encoded according to the communication scheme by the codec 107. In the case of W-CDMA, the encoded voice data is output to the transmission unit 104 after having required processing performed thereon by the baseband processing unit 106. The transmission unit 104 is provided with a modulator, a frequency converter, and a transmission power amplifier. After modulating the voice data in accordance with the communication scheme, the transmission unit 104 frequency converts the modulated data to a wireless frequency signal by synthesizing the modulated data with a transmitter local oscillator signal generated by the frequency synthesizer 105. The converted signal is transmitted to the base station (not shown) via the antenna duplexer 102 and the antenna 101 after being amplified.

The user is able to end the telephone conversation by operating the key operation unit 8.

Next, the processing when there is an outgoing call will be described.

The user inputs the telephone number of the communication partner and gives the instruction for an outgoing call by operating the key operation unit 8. When an instruction for an outgoing call is given, the CPU 114 sends data for the outgoing call to the baseband processing unit 106. The baseband processing unit 106 sends the data for the outgoing call to the transmission unit 104, which performs modulation, frequency conversion and amplification on the received data as described above, and transmits the resultant signal to the base station (not shown) using the antenna duplexer 102 and the antenna 101.

The base station confirms the incoming call from the communication partner and sends a wireless signal, which is received by the antenna 101, and similar processing to the case of an incoming call described above is then executed.

In the case of transmitting an email, the user gives the instruction for email creation using the key operation unit 8. When the instruction for email creation is given, the CPU 114 controls the display control unit 119 to display an email creation screen on the display unit 2. The user inputs the send-to address and the body, and gives the instruction for transmission using the key operation unit 8. When the instruction for email transmission is given, the CPU 114 sends the address information to the baseband processing unit 106, and the body data to the codec 107. The codec 107 encodes the body data and sends the encoded data to the baseband processing unit 106.

The baseband processing unit 106 sends the address and body data to the transmission unit 104, which performs modulation and other processing on the received data, and transmits the resultant signal to the base station via the antenna duplexer 102 and the antenna 101.

An antenna 108, an antenna duplexer 109, a reception unit 110, a transmission unit 111, a frequency synthesizer 112, and a baseband processing unit 113 in the communication unit 123 have respectively similar functions to corresponding blocks in the first communication unit 122. There may, however, also be changes tailored to differences in the communication schemes.

In the present embodiment, subscriber identifiers are read from the SIM cards mounted in the SIM slots 3 and 4, and communication is performed based on these subscriber identifiers.

Here, information stored on a SIM card will be described. FIG. 5 shows information stored on a SIM card.

The SIM card stores an Integrated Circuit Card ID (IC Card ID) 501, an International Mobile Subscriber Identity (IMSI) 502, an Authentication Key Value 506, a PIN code 507, a telephone directory 510, email data 512, and a reserve 513.

The IC Card ID 501 is information for uniquely identifying the SIM card. The IMSI 502 is information for specifying the subscriber provided by the contracted carrier. The IMSI 502 is constituted by a Mobile Country Code (MCC) 503, a Mobile Network Code (MNC) 504, and a Mobile Subscriber Identification Number (MSIN) 505. The country of the contracted carrier can be discriminated by the MCC 503, and the contracted carrier can be identified by the MNC 504. The MSIN 505 is provided to the subscriber as a telephone number.

The Authentication Key Value 506 is information for performing authentication with the phone in order to access the telephony network provided by the carrier. The PIN (Personal Identification Number) code 507 is an authentication code for specifying the user when a SIM card is mounted in the phone, in order to protect against unauthorized use by a third party. Two types of PIN codes (PIN code 1 508, PIN code 2 509) can be saved.

The telephone directory 510 includes a fixed dialing telephone directory 511 whereby an outgoing call is enabled by entering the PIN code 2 509.

Next, SIM card detection, and controls on the communication units 122 and 123 and the display unit 2 performed when the phone is powered on will be described using the flowcharts of FIGS. 4A and B.

Note that with the phone 100 of the present embodiment, SIM cards cannot be removed from the SIM slots while the phone 100 is turned on. Therefore, when mounting or ejecting a SIM card, the user turns off the phone 100.

Figure 4A:
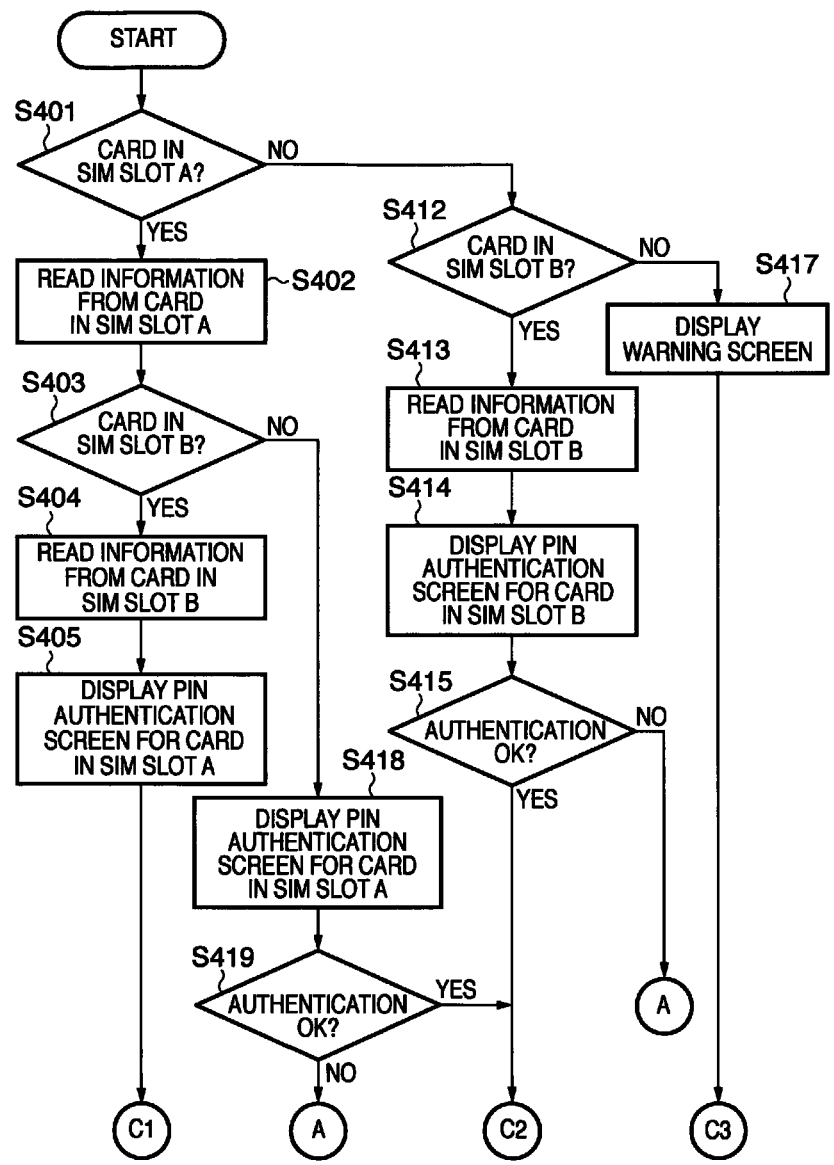
Figure 4B:
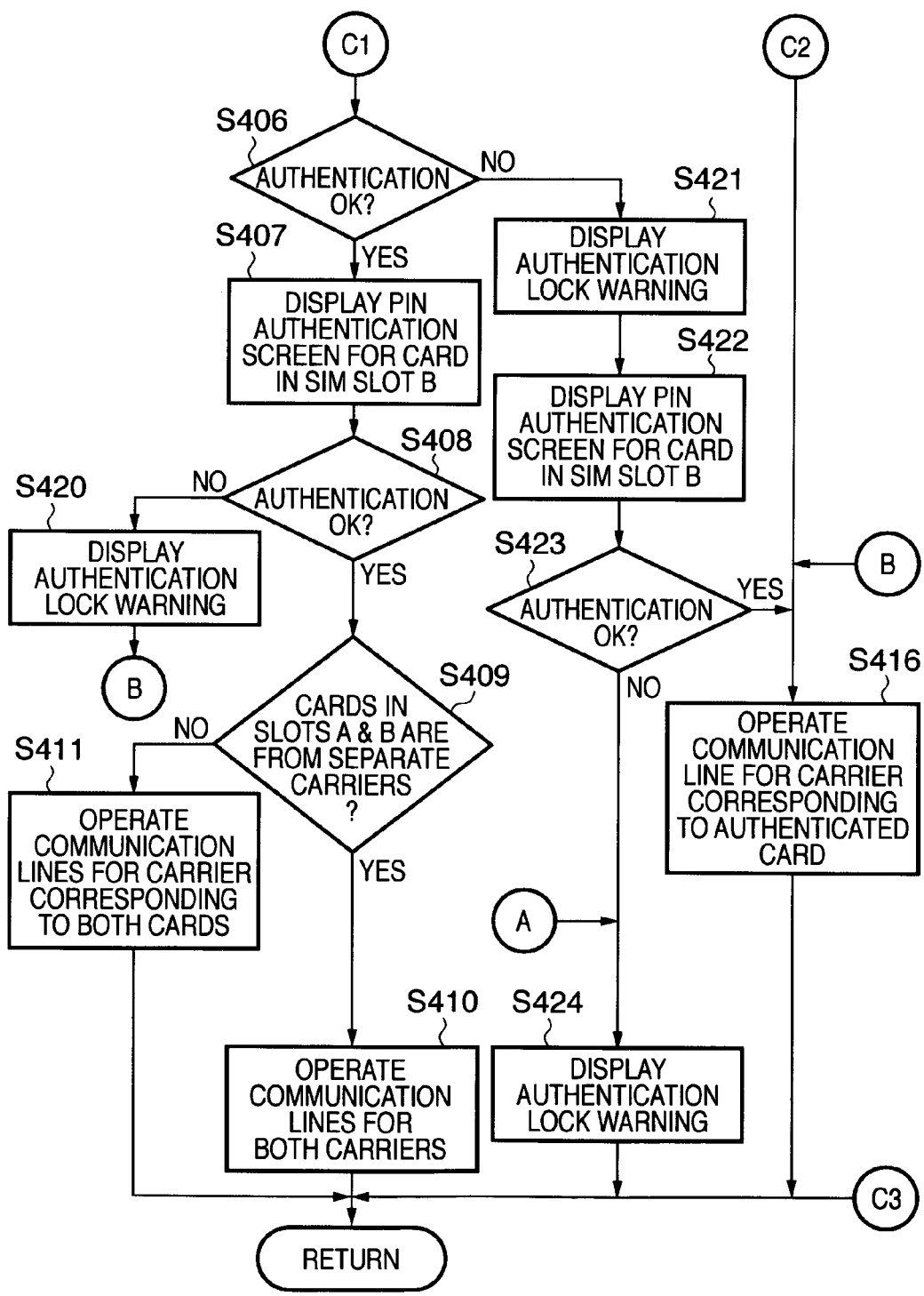

The flowcharts of FIGS. 4A and 4B start when the phone 100 is powered on by operating the key operation unit 8 after SIM cards have been ejected or mounted while the phone 100 was thus turned off. Note that the processing of FIGS. 4A and 4B is executed as a result of the CPU 114 controlling various units.

Firstly, it is determined whether a SIM card is mounted in the SIM slot 3 (S401). If a SIM card is mounted in the SIM slot 3, subscriber information like in FIG. 5 is read out from the SIM card via the SIM slot 3, and stored in the RAM 115 (S402).

Then, it is determined whether a SIM card is mounted in the SIM slot 4 (S403). If a SIM card is mounted in the SIM slot 4, subscriber information like in FIG. 5 is read out from the SIM card via the SIM slot 4, and stored in the RAM 115 (S404).

Figure 6:
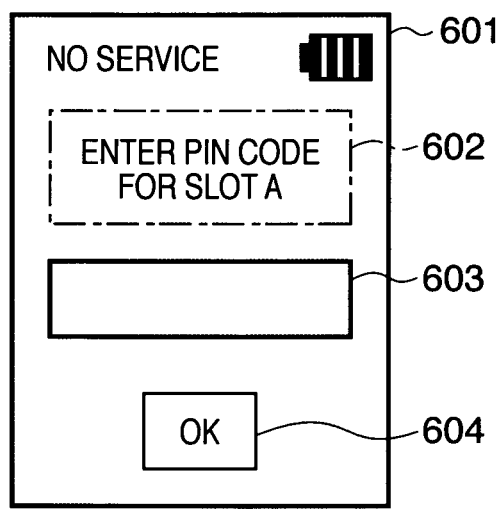
FIG. 6 shows a screen for entering a PIN code.

Next, a screen for authentication with the PIN code of the card in the SIM slot 3 is generated and displayed on the display unit 2 (S405). FIG. 6 shows a PIN code entry screen.

Reference numeral 601 denotes a display screen of the display unit 2 that displays a message 602 prompting the user to enter a PIN code. The user enters a PIN code in the entry field 603 using the key operation unit 8. Reference numeral 604 denotes a determination button.

Once a PIN code has been entered by the user after the PIN code entry screen is displayed, it is determined whether the entered code matches a PIN code read out from the card in the SIM slot 3 (S406). If the PIN code matches and is correctly authenticated, a screen for authenticating the PIN code of the card in the SIM slot 4 is generated and displayed on the display unit 2 (S407).

Once a PIN code has been entered by the user as described above, it is determined whether the entered code matches a PIN code read out from the card in the SIM slot 4 (S408). If the PIN code matches and is correctly authenticated, it is determined whether the card in the SIM slot 3 and the card in the SIM slot 4 are cards from separate carriers, based on identifiers read from the cards in the card slots (S409).

In the case where the two cards correspond to separate carriers, the communication units corresponding to the communication schemes of both carriers are operated (S410). For example, if the communication schemes of both carriers differ, the communication units 122 and 123 are operated together (S410). The communication lines to be used are determined based on the identifiers of the cards.

If, in S409, the card in the SIM slot 3 and the card in the SIM slot 4 correspond to the same carrier, the corresponding one of the communication units 122 or 123 is operated based on the identifiers of the cards (S411).

If, in S401, a SIM card is not mounted in the SIM slot 3, it is determined whether a SIM card is mounted in the SIM slot 4 (S412). If a SIM card is not mounted in the SIM slot 4, information to the effect that SIM cards are not mounted is displayed on the display unit 2 (S417), and predetermined processing is recommenced. Note that in the present embodiment, functions using the communication units 122 and 123 cannot be used if SIM cards are not mounted, although it is assumed that other functions can be used.

If, in S412, a card is mounted in the SIM slot 4, an identifier like in FIG. 5 is read out from the SIM card via the SIM slot 4, and stored in the RAM 115 (S413). Next, a screen for authentication with the PIN code of the card in the SIM slot 4 is generated and displayed on the display unit 2 (S414).

Once a PIN code has been entered by the user as described above, it is determined whether the entered code matches a PIN code read out from the card in the SIM slot 4 (S415). If the PIN code matches and is correctly authenticated, whichever of the communication unit 122 and 123 corresponds to the authenticated card (here, the card in the SIM slot 4) is operated (S416).

If, in S403, a SIM card is not mounted in the SIM slot 4, there will only be a SIM card mounted in the SIM slot 3. A screen for authentication with the PIN code of the card in the SIM slot 3 is therefore generated and displayed on the display unit 2 (S418). Once a PIN code has been entered by the user, it is determined whether the entered code matches a PIN code read out from the card in the SIM slot 3 (S419).

If the PIN code matches and is correctly authenticated, the processing proceeds to S416, where the communication unit corresponding to authenticated card (here, card in the SIM slot 3) is operated.

If, in S406, the PIN code of the card in the SIM slot 3 is not correctly authenticated, authentication using the card in the SIM slot 3 will have failed, and a warning message to the effect that the line cannot be used is displayed on the display unit 2 (S421).

A screen for authentication with the PIN code of the card in the SIM slot 4 is then generated and displayed on the display unit 2 (S422).

Once a PIN code has been entered by the user as described above, it is determined whether the entered code matches a PIN code read out from the card in the SIM slot 4 (S423). If the PIN code matches and is correctly authenticated, the processing proceeds to S416, where the communication unit corresponding to the authenticated card (here, card in the SIM slot 4) is operated.

Because authentication of the PIN codes will have failed for the cards in both the SIM slots 3 and 4 if authentication of the PIN code fails in S423, a warning message to that effect is displayed on the display unit 2 (S424).

If, in S408, the PIN code of the card in the SIM slot 4 is not correctly authenticated, authentication using the card in the SIM slot 4 will have failed, and a warning message to the effect that the line cannot be used is displayed on the display unit 2 (S420).

In this case, only the PIN code of the card in the SIM slot 3 will have been correctly authenticated, and the processing proceeds to S416, where the communication unit corresponding to the authenticated card (here, card in the SIM slot 3) is operated. A screen for the line corresponding to the authenticated card is then generated by the display control unit 119, and displayed on the display unit 2.

If, in S415 or S419, the PIN code is not correctly authenticated, authentication of the SIM card mounted in either the SIM slot 3 or the SIM slot 4 will have failed, with there being no card mounted in the other SIM slot.

Therefore, the processing proceeds to S424, where warning information is displayed to the effect that PIN code authentication of the SIM card has failed and authentication is locked.

The communication lines to be used are thereby determined when the phone is powered on, in accordance with identifiers read out from the SIM cards mounted in the SIM slots 3 and 4.

Next, an outgoing call process using an address book in the present embodiment will be described.

Figure 7:
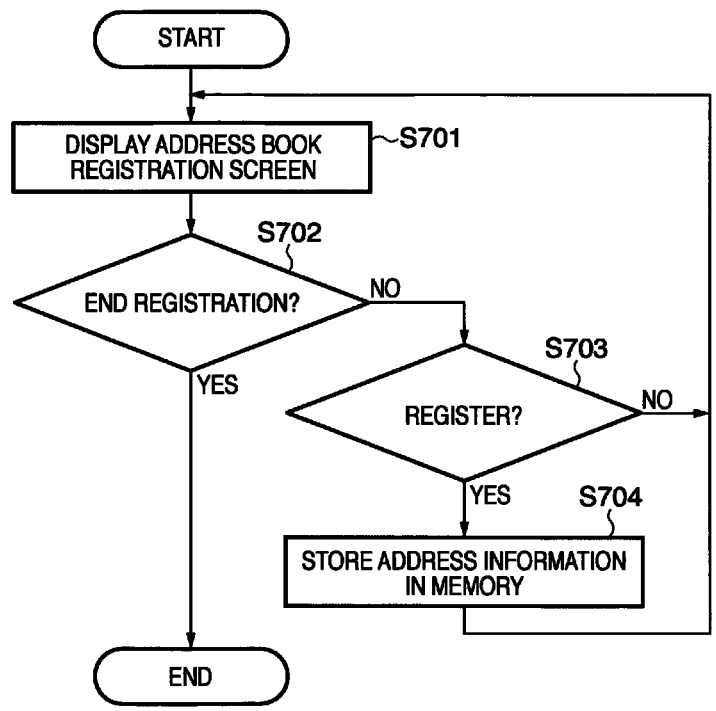
FIG. 7 is a flowchart showing an address book registration process.

Firstly, a process for registering telephone numbers and carriers in the address book will be described. FIG. 7 is a flowchart showing an address book registration process. The processing in FIG. 7 is realized under the control of the CPU 114.

The flowchart starts when the instruction for the address book registration process is given by the user operating the key operation unit 8.

Figure 8:
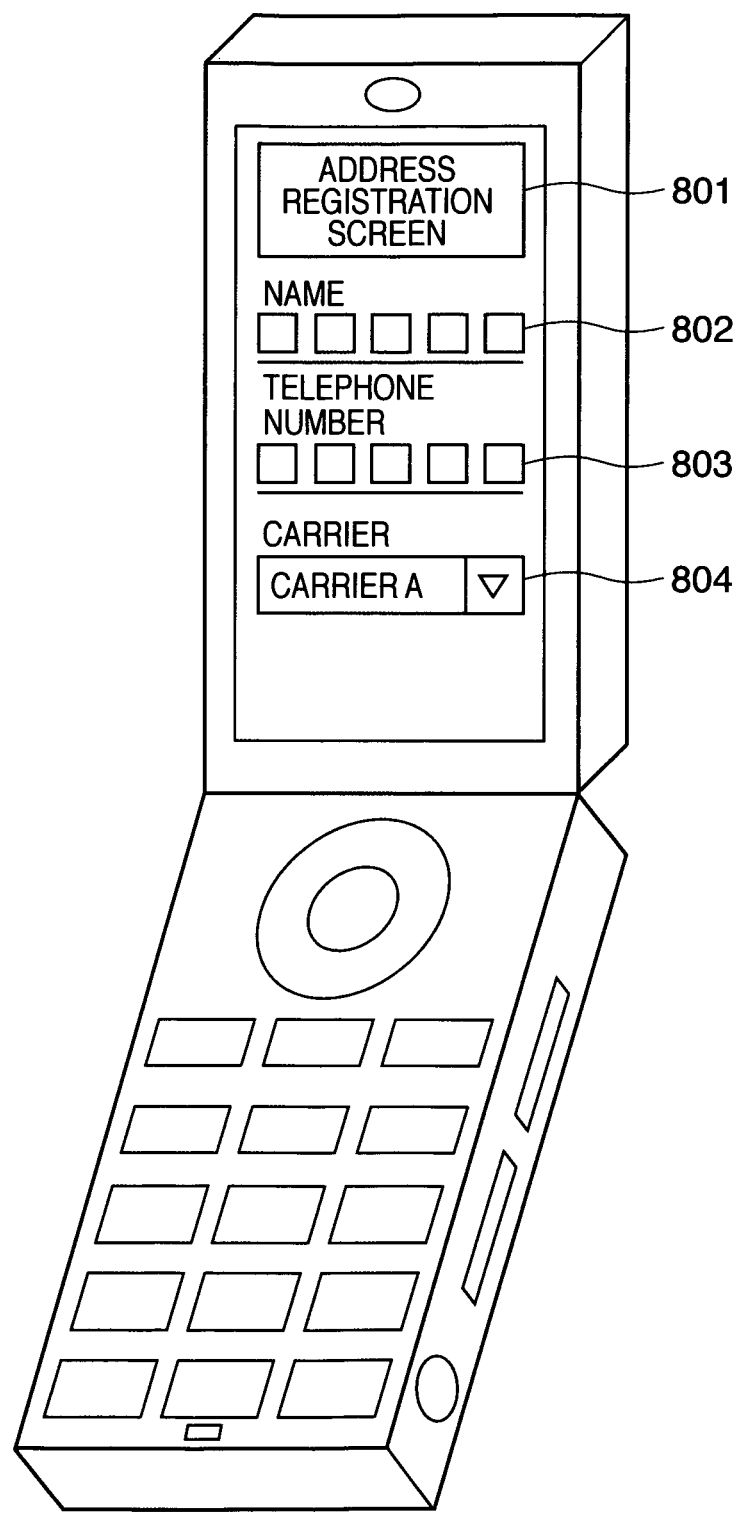
FIG. 8 shows an address book registration screen.

Firstly, the registration screen shown in FIG. 8 is displayed on the display unit 2 (S701). In FIG. 8, reference numeral 801 denotes the address book registration screen. The user is able to enter respectively required information to a name field 802, a telephone number field 803 and a carrier field 804 by operating the key operation unit 8.

After displaying the address book registration screen, the CPU 114 waits for entries by the user, and when the instruction for registration is given (S702 to S703), generates address book information in which the information entered in the fields at this point is registered, and stores the generated address book information in the EEPROM 117 (S704). If the instruction to end registration is given, the registration process is ended (S702).

FIG. 9 shows address book information 900 stored in the EEPROM 117 as a result of the address book registration process.

As shown in FIG. 9, the address book information 900 includes names 901, telephone numbers 902, carriers 905 and additional information 906. Telephone numbers 902 and carriers 905 are registered in association with the names 901 of communication partners. Note that in the present embodiment, a plurality of telephone numbers can be registered per user, and in the case where a plurality of numbers are registered, telephone numbers 903 and 904 will be further stored. In FIG. 9, information for the two users 907 and 908 is stored.

Next, a process for setting a default carrier will be described.

Figure 10:
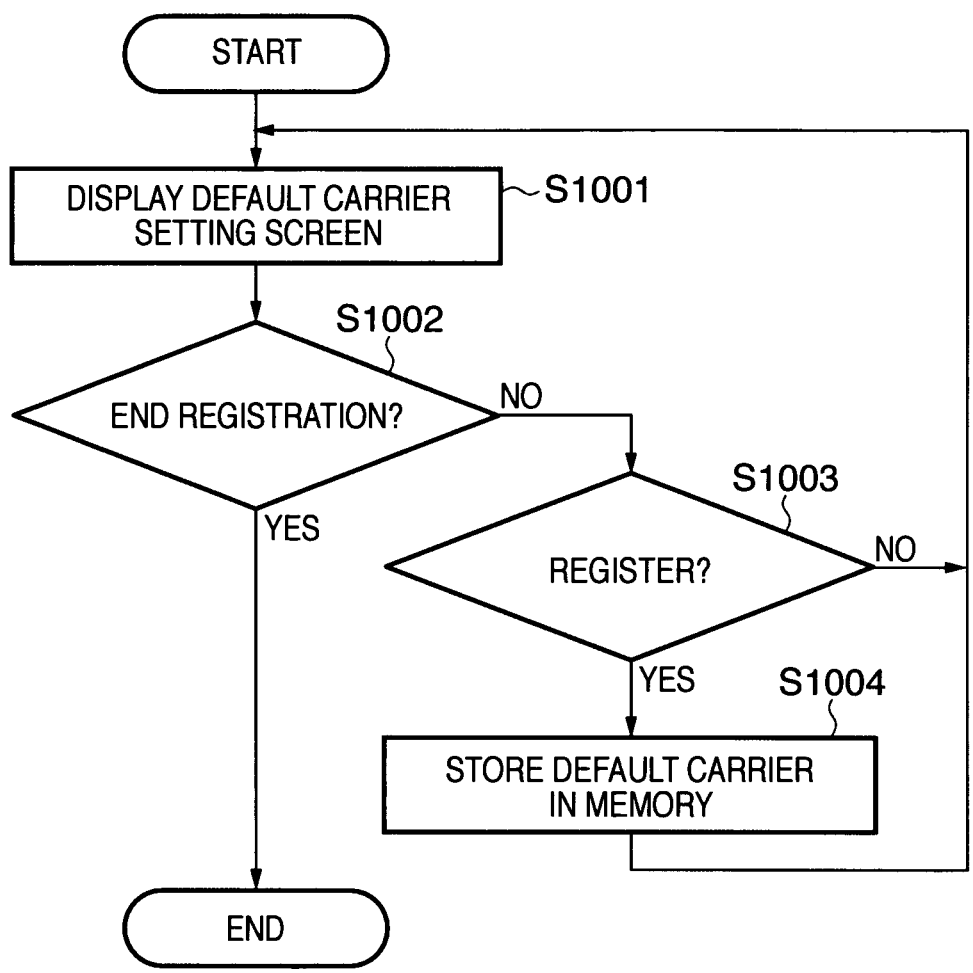
FIG. 10 is a flowchart showing a default carrier setting process.

In the present embodiment, a carrier to be used in the case where the communication partner's carrier is not registered in the address book information can be set as a default carrier. FIG. 10 is a flowchart showing a default carrier setting process.

The flowchart starts when the instruction for the default carrier setting process is given by the user operating the key operation unit 8.

Figure 11:
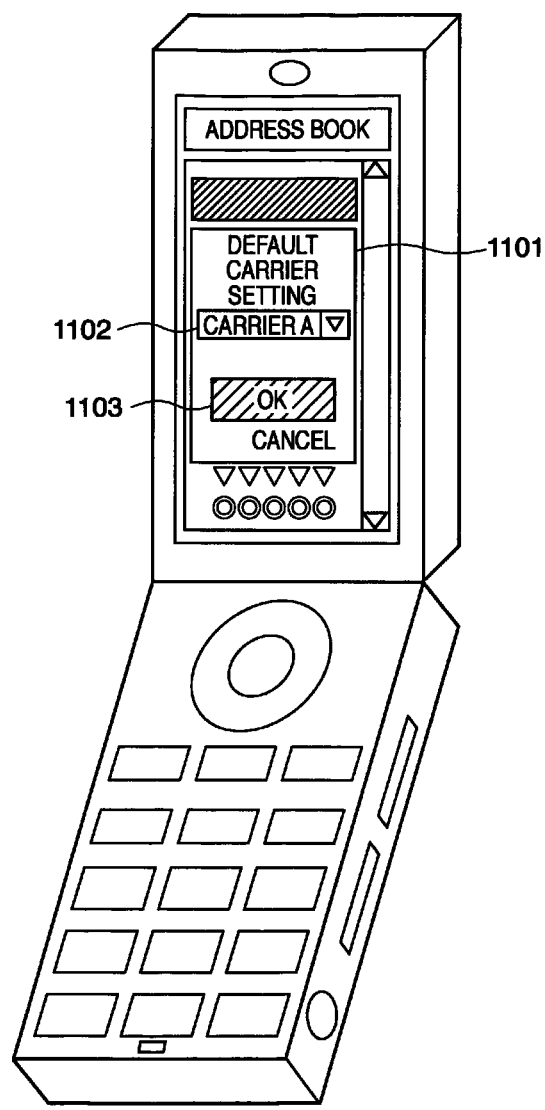
FIG. 11 shows a default carrier setting screen.

Firstly, the default carrier setting screen shown in FIG. 11 is displayed on the display unit 2 (S1001). In FIG. 11, reference numeral 1101 denotes a default carrier setting screen. The user selects the carrier that he or she wants to set as the default carrier from the carriers displayed on a pull-down menu in a carrier entry field 1102, by operating the key operation unit 8. The instruction for registration can be given by moving a cursor 1103. Note that the carriers displayed on the pull-down menu at this time correspond to communication lines that were activated in the processing of FIGS. 4A and 4B.

After displaying the default carrier setting screen, the CPU 114 waits for an entry by the user, and when the instruction for registration is given (S1002 to S1003), stores information showing the set default carrier in the EEPROM 117 (S1004). If the instruction for the end of registration is given, the registration process is ended (S1002).

Figure 12:
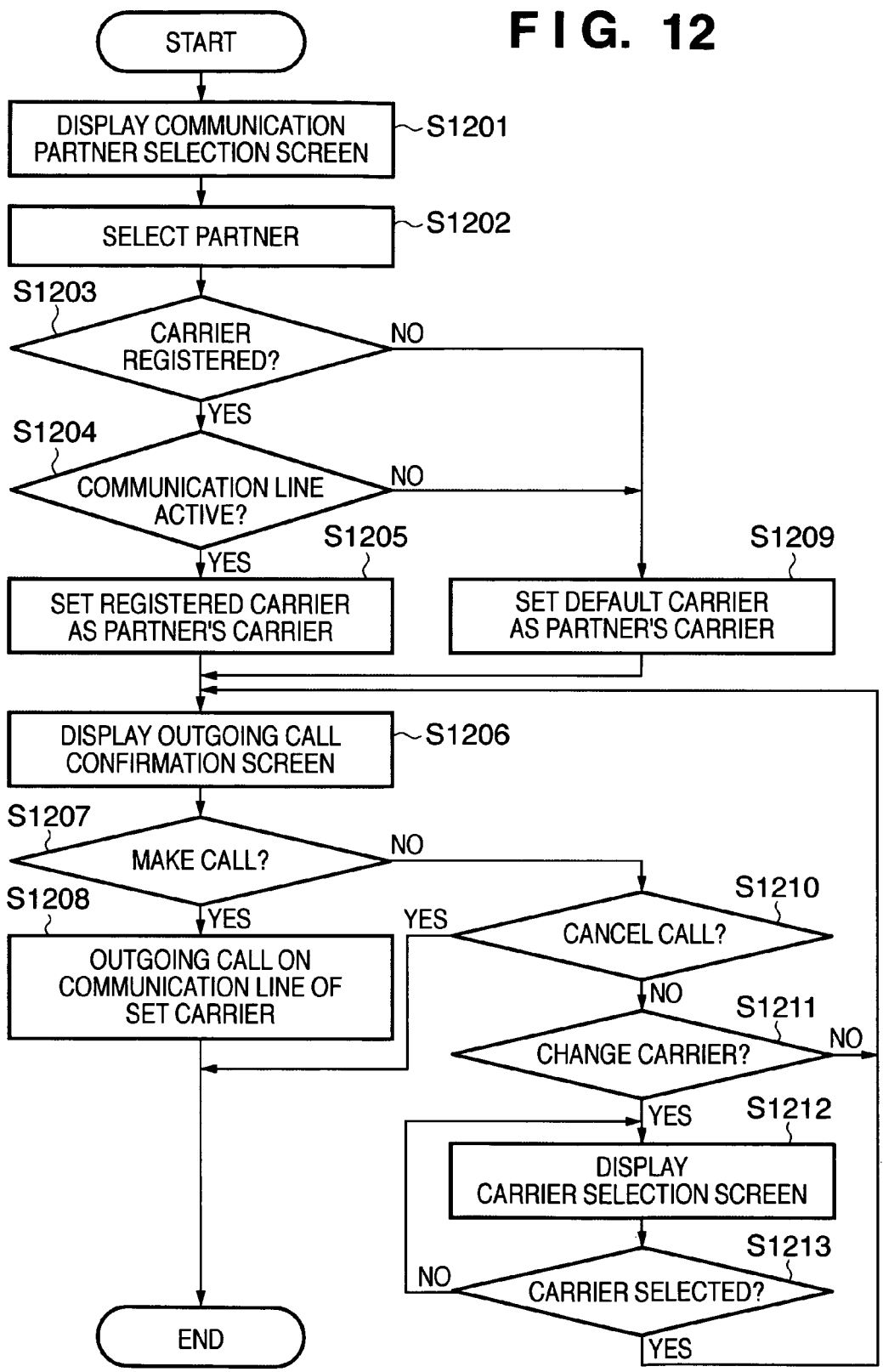
FIG. 12 is a flowchart showing an outgoing call process using the address book.

Next, an outgoing call process using the address book will be described. FIG. 12 is a flowchart showing an outgoing call process using the address book. The processing in FIG. 12 is realized under the control of the CPU 114.

The flowchart starts when the instruction for the outgoing call process using the address book is given by the user operating the key operation unit 8.

Figure 13:
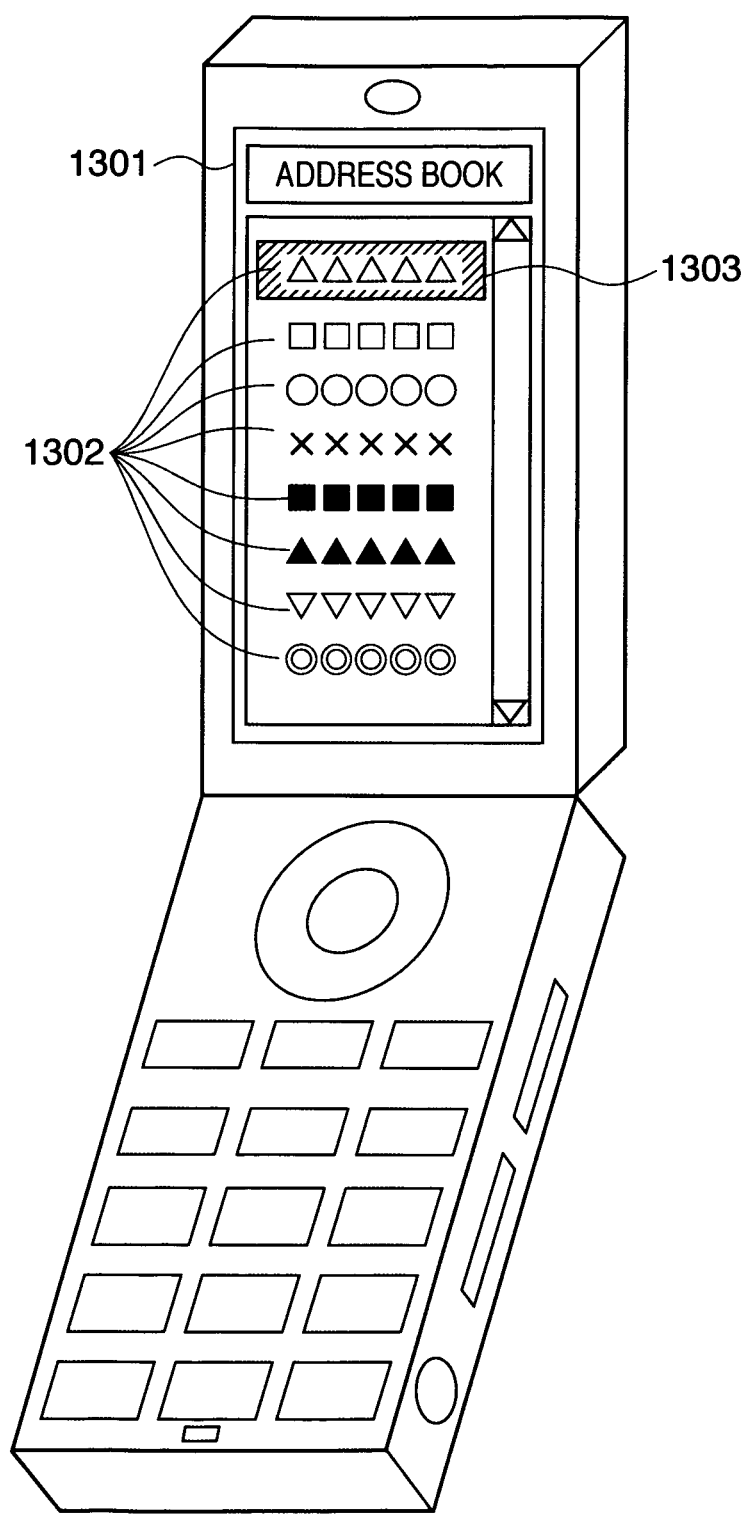
FIG. 13 shows an address book display screen.

Firstly, the communication partner selection screen shown in FIG. 13 is displayed on the display unit 2, based on the address book information stored in the EEPROM 117 (S1201). In FIG. 13, reference numeral 1301 denotes a communication partner selection screen. Names 1302 registered in the address book information and a cursor 1303 are displayed on the screen 1301. The user selects and confirms a communication partner by operating the key operation unit 8 to move the cursor 1303 (S1202).

Once a communication partner is selected, it is determined whether a carrier of the selected partner is registered in the address book information (S1203).

For example, in FIG. 9, a carrier of a user 908 is not registered. In this case, the default carrier set by the user is set as the partner's carrier, in accordance with the information showing the default carrier stored in the EEPROM 117 (S1209).

On the other hand, in FIG. 9, information showing a carrier is registered for a user 907. It is therefore determined whether the carrier registered in the address book information corresponds to an active communication line resulting from the processing in FIGS. 4A and 4B (S1204). If the registered carrier does not correspond to an active communication line, the processing proceeds to S1209, and the default carrier is set as the partner's carrier. If the registered carrier does correspond to an active communication line, the carrier registered in the address book information is set as the partner's carrier (S1205).

Figure 14:
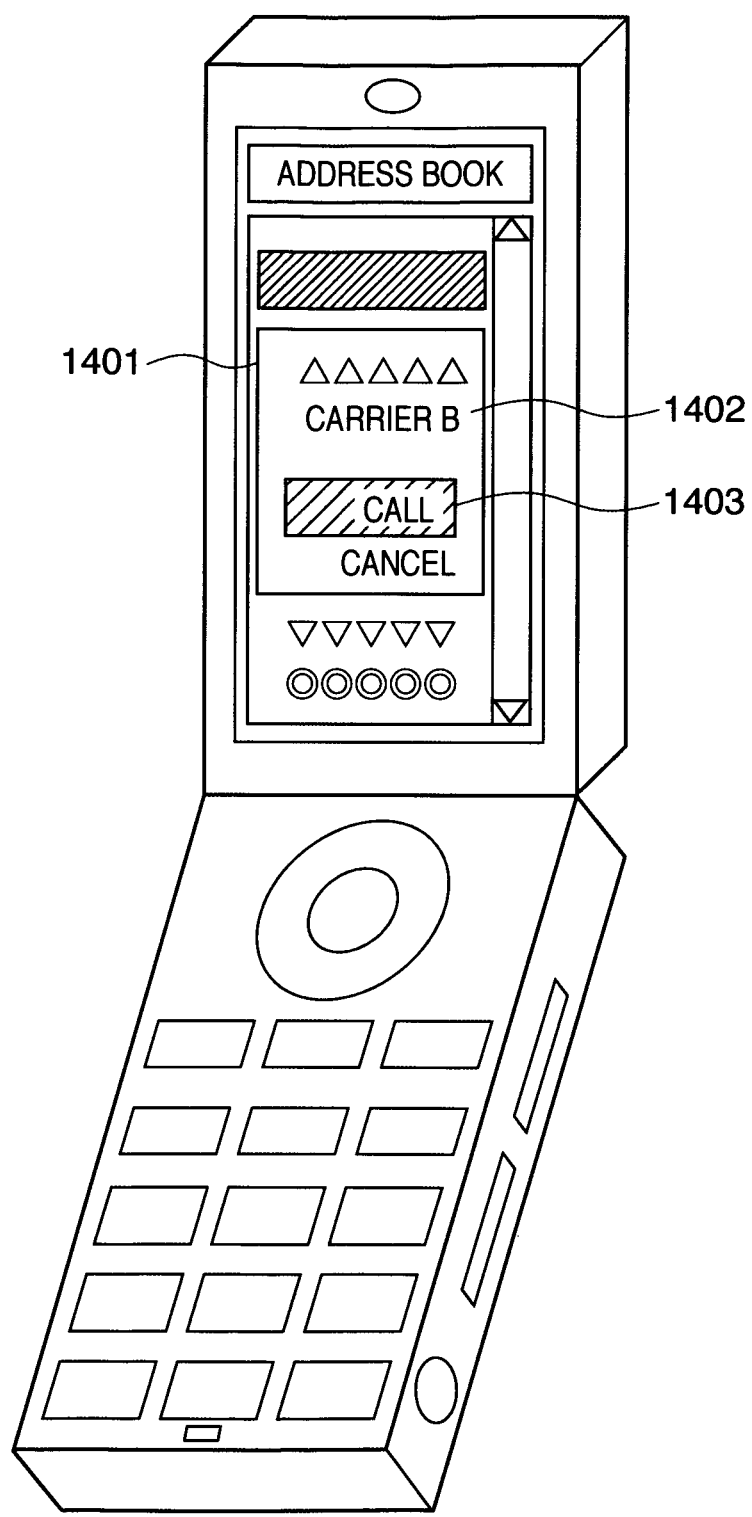
FIG. 14 shows an outgoing call confirmation screen.

Once the partner's carrier is thereby set, the outgoing call confirmation screen 1401 shown in FIG. 14 is then displayed on the display unit 2 (S1206). In FIG. 14, reference numeral 1401 denotes the outgoing call confirmation screen. Information 1402 showing the selected partner's name and the set carrier, and a cursor 1403 are displayed on the screen 1401. The user decides whether to make the outgoing call, by operating the key operation unit 8 to move the cursor 1403 (S1207).

If the instruction for the outgoing call is given by the user, an outgoing call process as aforementioned is executed on the user's telephone number registered in the address book information and a call is initiated, using the communication line of the set carrier (S1208).

If, instead of the instruction for the outgoing call being given, a prescribed operation key is operated to give the instruction for cancellation of the outgoing call, the processing is ended without making the outgoing call (S1210).

If the user wants to change the carrier after checking the outgoing call confirmation screen, he or she moves the cursor 1403 and gives the instruction for suspension (S1211). A carrier selection screen (not shown) is then displayed on the display unit 2 (S1212). With this carrier selection screen, a pull-down screen for selecting a carrier is displayed, as shown in FIG. 8. The carriers displayed at this time will be carriers that are usable with the SIM card 5 or 6.

Once a carrier is selected by the user, the processing returns to S1206, where the outgoing call confirmation screen is displayed (S1213).

Figure 15:
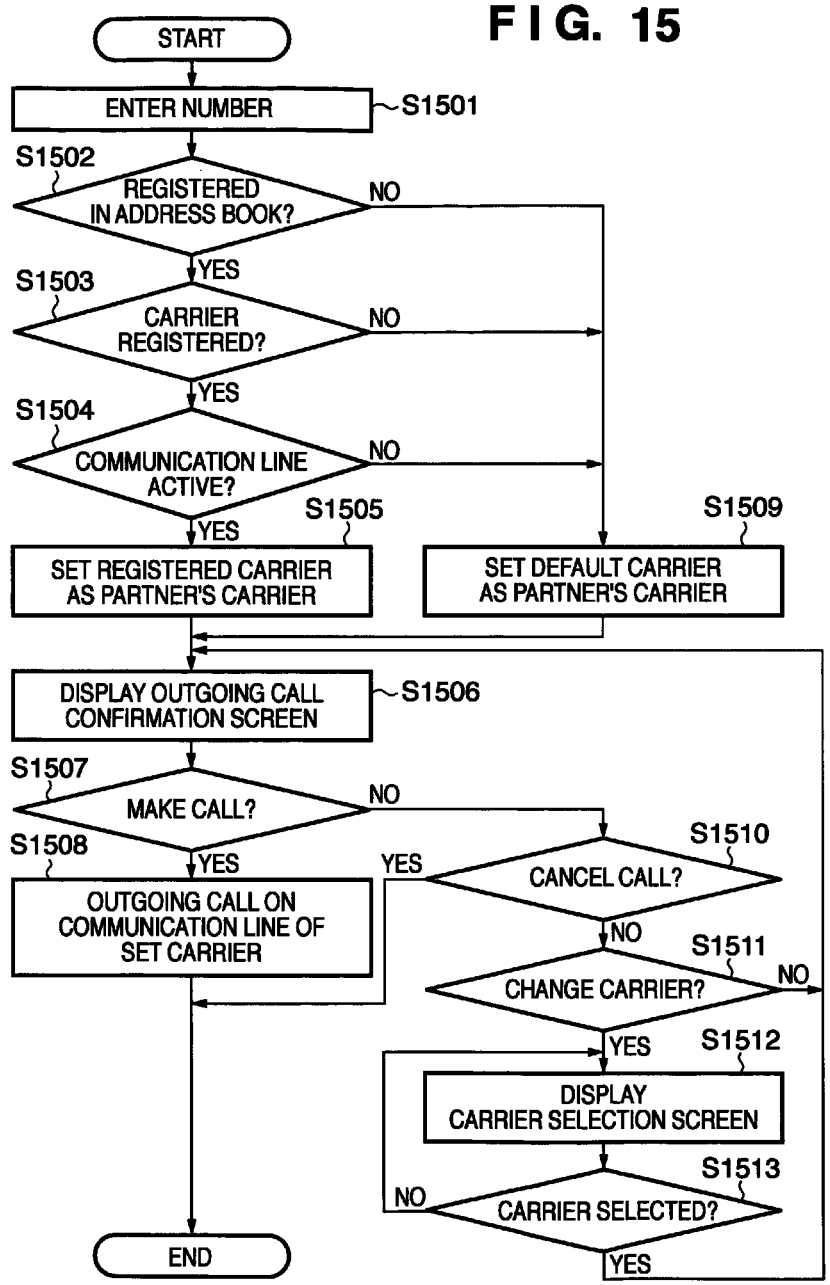
FIG. 15 is a flowchart showing an outgoing call process using telephone number entry.

Next, processing in the case where an outgoing call is made by the user operating the key operation unit 8 to directly enter the partner's telephone number without using the address book will be described. FIG. 15 is a flowchart showing an outgoing call process using telephone number entry. The processing in FIG. 15 is realized under the control of the CPU 114.

The communication partner's telephone number can be entered by the user operating the key operation unit 8 while viewing the display unit 2. Once the partner's telephone number is entered by the user (S1501), it is determined whether the entered number is registered in the address book information, based on the address book information stored in the EEPROM 117 (S1502).

If the entered telephone number is not registered in the address book information, the default carrier set by the user is set as the partner's carrier, in accordance with information showing the default carrier stored in the EEPROM 117 (S1509).

If the entered number is registered in the address book information, it is further determined whether a carrier of the partner corresponding to the entered telephone number is registered in the address book information (S1503). If a carrier is not registered, the processing proceeds to S1509, where the default carrier is set as the partner's carrier.

If a carrier of the partner corresponding to the entered telephone number is registered in the address book information, it is determined whether the registered carrier corresponds to an active communication line resulting from the processing in FIGS. 4A and 4B (S1504). If the registered carrier does not correspond to an active communication line, the processing proceeds to S1509, and the default carrier is set as the partner's carrier. If the registered carrier does correspond to an active communication line, the carrier registered in the address book information is set as the partner's carrier (S1505).

Once the partner's carrier is thereby set, the outgoing call confirmation screen 1401 shown in FIG. 14 is displayed on the display unit 2 (S1506). The user decides whether to make the outgoing call, by operating the key operation unit 8 to move the cursor 1403 (S1507).

If the instruction for the outgoing call is given by the user, an outgoing call process as aforementioned is performed on the user's telephone number entered in S1501 and a call is initiated, using the communication line of the set carrier (S1508).

If, instead of the instruction for the outgoing call being given, a prescribed operation key is operated to give the instruction for cancellation of the outgoing call, the processing is ended without making the outgoing call (S1510).

If the user wants to change the carrier after checking the outgoing call confirmation screen, he or she moves the cursor 1403 and gives the instruction for suspension (S1511). A carrier selection screen (not shown) is then displayed on the display unit 2 (S1512). With this carrier selection screen, a pull-down screen for selecting a carrier is displayed, as shown in FIG. 8. The carriers displayed at this time will be carriers that are usable with the SIM card 5 or 6.

Once a carrier is selected by the user, the processing returns to S1506, where the outgoing call confirmation screen is displayed (S1513).

In the present embodiment, information showing the communication carriers of communication partners is thereby registered in the address book information, in addition to names and telephone numbers. Then, when making an outgoing call, a carrier to be used is selected, in accordance with the information showing the carriers registered in the address book information.

Therefore, the user is able to easily select a carrier to be used, even in the case where communication is performed using a plurality of carriers, without needing to select a carrier to be used every time an outgoing call is made.

Note that depending on the details of the user's contract, using the same carrier as the partner may enable calls to be made under advantageous conditions, such as free call charges or the like, in comparison to using a different carrier.

According to the present embodiment, the user is able to easily select a carrier with favorable conditions, because the communication partner's carrier registered in the address book information is automatically selected.

Note that while a call process was described in the present embodiment, an email transmission process can be similarly realized.

That is, by registering email addresses in the address book information in addition to telephone numbers, a carrier corresponding to the partner's carrier can be automatically selected when sending an email and the email sent using the selected carrier.

Also, any information for identifying the address (i.e., destination) of a communication partner may be used, besides an email address. By registering address identifying information and information showing a carrier thereof in the address book information, the carrier corresponding to the partner's carrier can be automatically selected and communication performed using the selected carrier, similarly to the present embodiment.

In the present embodiment, a call is made using a default carrier registered by the user, if a carrier of the partner is not registered in the address book information.

However, a communication line tailored to a predetermined carrier may be selected from the active communication lines when a call is processed, instead of the user registering a default carrier.

Embodiment 2

A second embodiment will be described next.

The configuration of the phone 100 and the basic communication processing in the present embodiment are similar to the first embodiment.

In the first embodiment, only one carrier per communication partner is registered in the address book information. However, it is conceivable that the partner's phone is also capable of using a plurality of carriers, like the phone of the present embodiment.

The case where a plurality of carriers can be registered for a single communication partner will therefore be described in the present embodiment.

Figure 16:
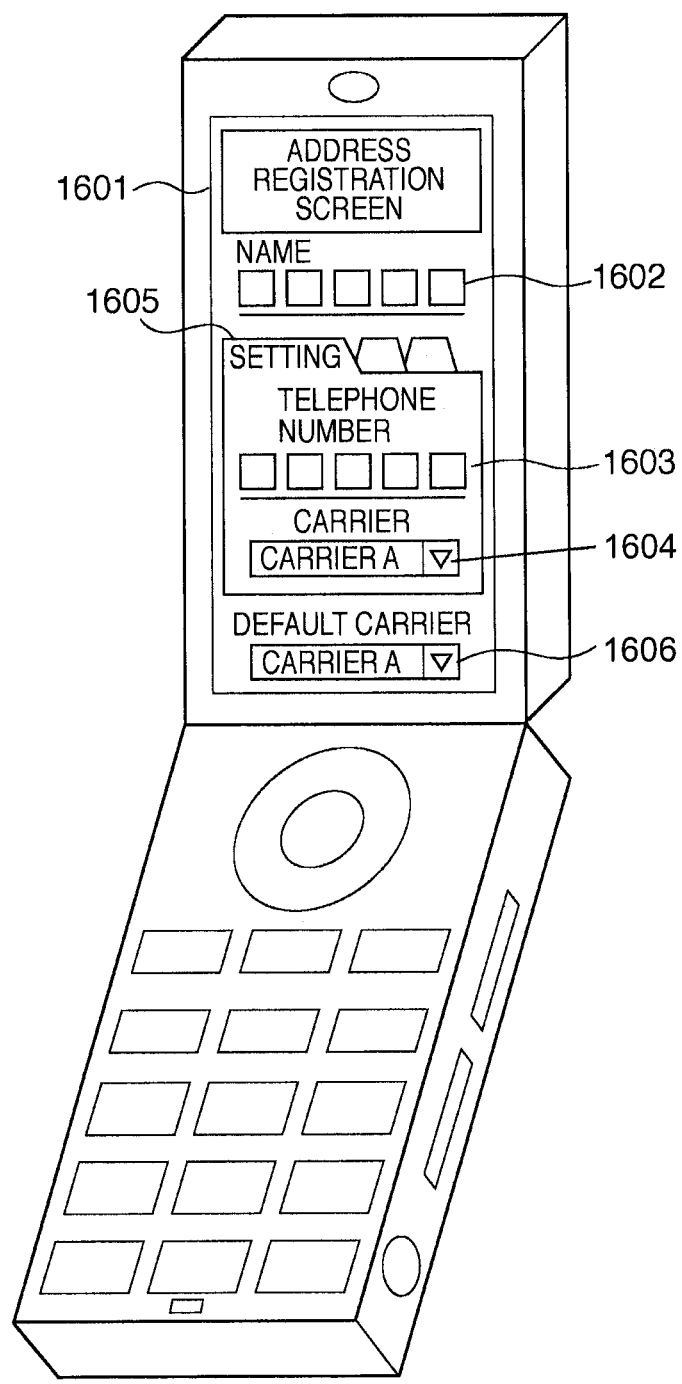
FIG. 16 shows an address book registration screen.

In the present embodiment, the display screen (an address book registration screen 1601) in FIG. 16 is displayed on the display unit 2 in S701, during the address book registration process of FIG. 7. FIG. 16 shows the address book registration screen. In FIG. 16, tabs 1605 for selecting telephone numbers and carriers are displayed on the address book registration screen 1601, in addition to a name field 1602, a telephone number field 1603 and a carrier field 1604. The user is able to switch the tabs 1605 by operating the key operation unit 8. A plurality of telephone numbers and carriers can thereby be registered for a single communication partner. A default carrier entry field 1606 is also displayed. The plurality of carriers registered in the carrier field 1604 of the tab 1605 in correspondence with the name in the name field 1602 are displayed as a pull-down menu in the default carrier entry field 1606. The user selects a carrier to set as the default carrier from the carriers displayed as a pull-down menu in the default carrier entry field 1606.

FIG. 17 shows address book information 900 stored in the EEPROM 117 as a result of the address book registration process of the present embodiment.

As shown in FIG. 17, the address book information 900 includes names 901, telephone numbers 902 and 903, carriers 905 and additional information 906. In the present embodiment, information showing a second carrier 909 and a default carrier 910 is further included. In FIG. 17, information for the three users 907, 908 and 911 is stored.

Also, for the user 911, two telephone numbers, two carriers and a default carrier are registered.

Figure 18B:
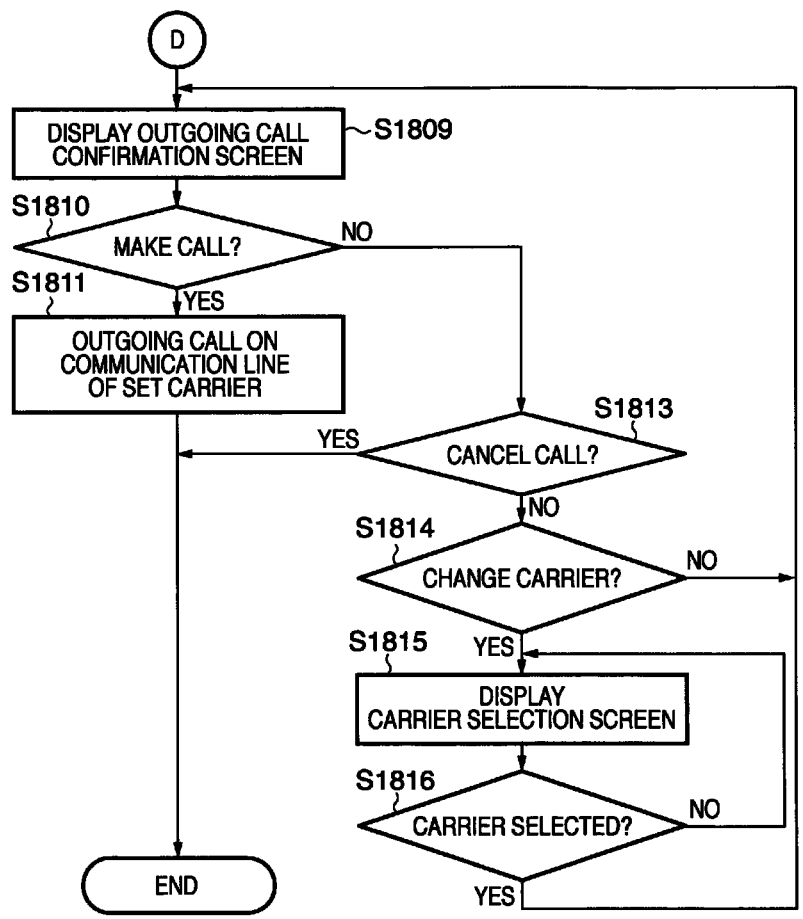

Next, an outgoing call process using the address book will be described. FIGS. 18A and 18B are flowcharts showing an outgoing call process using the address book. The processing in FIGS. 18A and 18B is realized under the control of the CPU 114.

The flowchart starts when the instruction for an outgoing call process using the address book is given by the user operating the key operation unit 8.

Firstly, the communication partner selection screen shown in FIG. 13 is displayed on the display unit 2, based on the address book information stored in the EEPROM 117 (S1801). The user selects and confirms a communication partner from the names displayed on the communication partner selection screen (S1802).

Once a communication partner is selected, it is determined whether a carrier of the selected partner is registered in the address book information (S1803). If a carrier is not registered, the default carrier set by the user is set as the partner's carrier, in accordance with the information showing the default carrier stored in the EEPROM 117 (S1812).

On the other hand, if a carrier of the selected partner is registered, it is further determined whether there is a plurality of carriers registered for the selected partner (S1804). If there is one registered carrier, the processing proceeds to S1807.

If there is a plurality of registered carriers, it is determined whether the selected partner is included in communication history information (S1805).

Communication history will be described here.

In the present embodiment, information showing the numbers, names and carriers of partners regarding outgoing and incoming calls made from the phone 100 are held in the EEPROM 117 dating back several tens of calls. The appearance of the communication history information is shown in FIG. 19. As shown in FIG. 19, the communication history information 1900 includes names 1901 and telephone numbers 1902 of communication partners, outgoing call dates and times 1903 and information 1904 showing the carriers used at the time. Note that the names 1901 are only held if the telephone numbers 1902 are registered in the address book information.

In the case where the user selects a partner 1905 as the communication partner, for example, the communication history information 1900 includes information showing the carrier of this partner 1905.

If the selected partner is thereby included in the communication history information, the carrier included in the communication history information is selected (S1806). Note that if there is a plurality of communication histories included for the same communication partner, the carrier used during the most recent call is selected. On the other hand, if the selected partner is not included in communication history information, the default carrier registered in the address book information is selected (S1817).

Next, it is determined whether the carrier selected at S1806 or S1817 corresponds to an active communication line resulting from the processing in FIGS. 4A and 4B (S1807). If the selected carrier does not correspond to an active communication line, the processing proceeds to S1812, and the default carrier set by the user as a result of the processing of FIG. 10 is set as the partner's carrier. If the selected carrier does correspond to an active communication line, the selected carrier is set as the partner's carrier (S1808).

Once the partner's carrier is thereby set, the outgoing call confirmation screen 1401 shown in FIG. 14 is displayed on the display unit 2. The user decides whether to make the outgoing call, by operating the key operation unit 8 to move the cursor 1403 (S1810).

If the instruction for the outgoing call is given by the user, an outgoing call process as aforementioned is executed on the user's telephone number registered in the address book information and a call is initiated, using the communication line of the set carrier (S1811).

If, instead of the instruction for the outgoing call being given, a prescribed operation key is operated to give the instruction for cancellation of the outgoing call, the processing is ended without making the outgoing call (S1813).

If the user wants to change the carrier after checking the outgoing call confirmation screen, he or she moves the cursor 1403 and gives instruction for suspension (S1814). A carrier selection screen (not shown) is then displayed on the display unit 2 (S1815). With this carrier selection screen, a pull-down screen for selecting a carrier is displayed, as shown in FIG. 8. If, at S1804, there was a plurality of carriers registered, the registered carriers are displayed as selected carrier candidates. If, at S1804, there was not a plurality of carriers registered, carriers that are usable with the SIM card 5 or 6 are displayed.

Once a carrier is selected by the user, the processing returns to S1809, where the outgoing call confirmation screen is displayed (S1816).

According to the present embodiment, information showing a plurality of communication carriers for a communication partner is thereby registered in the address book information. A carrier to be used is selected from the plurality of carriers, in accordance with information showing the set default carrier.

Therefore, the user is able to easily select a carrier to be used, even in the case where communication is performed using a plurality of carriers, without needing to select a carrier to be used every time an outgoing call is made.

Note that in the first and second embodiments, the address book information is stored in the EEPROM 117, although the address book information can be stored in the memory card 13.

Also, while a mobile phone that uses SIM cards was described in the foregoing embodiments, the present invention can be similarly applied to a communication terminal that performs communication using a storage medium having a similar function to an SIM card.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-167459, filed Jun. 26, 2007, which is hereby incorporated by reference herein in its entirety.

The invention claimed is:

1. A communication terminal comprising:
a plurality of loading mechanisms into which a plurality of storage devices each storing an identifier concerning a communication carrier are loaded, each of the plurality of storage devices being capable of being detached from the communication terminal;
a readout unit which reads out the identifiers, from the plurality of storage devices loaded into the plurality of loading mechanisms;
a communication unit which determines the communication carriers based on the identifiers read out by the readout unit, and performs communication using the determined communication carriers;
a generation unit which generates, in accordance with an address book registration instruction by a user of the communication terminal, address book information in which information of a communication partner of another communication terminal than the communication terminal is registered in association with identifying information for identifying an address of the communication partner and carrier information indicating a communication carrier of the communication partner, wherein each of the information of the communication partner, the address of the communication partner, and the communication carrier of the communication partner is set by the user of the communication terminal, the generation unit registering the information of the communication partner set by the user in association with the identifying information of the communication partner set by the user and the carrier information indicating the communication carrier of the communication partner set by the user;
a memory which stores the address book information generated by the generation unit;
a designation unit which designates a communication partner;
a detection unit which detects a communication carrier corresponding to the communication partner designated by the designation unit from the carrier information registered in the address book information stored in the memory; and
a control unit which detects the identifying information of the communication partner designated by the designation unit from the identifying information registered in the address book information stored in the memory and controls the communication unit to perform communication with the communication partner using the communication carrier detected by the detection unit based on the detected identifying information of the communication partner designated by the designation unit.

2. The communication terminal according to claim 1, wherein the designation unit comprises a selection unit which selects a communication partner from a plurality of communication partners registered in the address book information.

3. The communication terminal according to claim 2, wherein the control unit controls the communication unit to perform communication with the designated communication partner using one of the communication carriers determined in accordance with the identifiers, if carrier information of the designated communication partner is not registered in the address book information.

4. The communication terminal according to claim 3, wherein the generation unit further sets, as a default carrier, one of the communication carriers determined in accordance with the identifiers and registers information of the default carrier in the memory, and wherein
the control unit detects the information of the default carrier registered in the address book information and controls the communication unit to perform communication with the designated communication partner using the detected default carrier, if carrier information of the designated communication partner is not registered in the address book information.

5. The communication terminal according to claim 1, wherein
the designation unit comprises a unit which enters an address of the communication partner, and
the control unit detects carrier information of the communication partner corresponding to the entered address, out of the carrier information registered in the address book information, and controls the communication unit to perform communication with the communication partner corresponding to the address using the detected communication carrier.

6. The communication terminal according to claim 5, wherein the control unit controls the communication unit to perform communication with the communication partner corresponding to the entered address using one of the communication carriers determined in accordance with the identifiers, if carrier information of the communication partner is not registered in the address book information.

7. The communication terminal according to claim 6, wherein the generation unit sets, as a default carrier, one of the communication carriers determined in accordance with the identifiers and registers information of the default carrier in the memory, and wherein the control unit detects the information of the default carrier and controls the communication unit to perform communication with the designated communication partner using the detected default carrier, if carrier information of the designated communication partner is not registered in the address book information.

8. The communication terminal according to claim 1, wherein the control unit controls the communication unit to perform communication with the communication partner using one of the communication carriers determined in accordance with the identifiers, if the communication unit cannot use the detected communication carrier.

9. The communication terminal according to claim 8, further comprising a unit which sets, as a default carrier, one of the communication carriers determined in accordance with the identifiers, wherein the control unit controls the communication unit to perform communication with the communication partner using the default carrier, if the communication unit cannot use the detected communication carrier.

10. The communication terminal according to claim 1, wherein the generation unit is capable of registering, in the address book information, carrier information showing a plurality of communication carriers determined in accordance with the identifiers.

11. The communication terminal according to claim 10, wherein the designation unit comprises a selection unit which selects a communication partner from a plurality of communication partners registered in the address book information, the detection unit detects the plurality of communication carriers shown by the carrier information of the designated communication partner, and the control unit controls the communication unit to perform communication with the designated communication partner using one of the detected plurality of communication carriers.

12. The communication terminal according to claim 11, wherein the generation unit sets, as a default carrier, one of the detected plurality of communication carriers and registers information of the default carrier in association with the information of the communication partner, and wherein the control unit detects the information of the default carrier, which corresponds to the designated communication partner and which is registered in the address book information, and controls the communication unit to perform communication using the default carrier, out of the detected plurality of communication carriers.

13. The communication terminal according to claim 11, further comprising a unit which generates history information showing previous communication partners and communication carriers that were used to communicate with the previous communication partners, wherein the control unit selects one of the detected plurality of communication carriers, and controls the communication unit to perform communication using the selected communication carrier.

14. The communication terminal according to claim 13, wherein the control unit selects, out of the detected plurality of communication carriers, a communication carrier previously used to perform communication with the designated communication partner, based on the history information.

15. The communication terminal according to claim 11, wherein the control unit controls the communication unit to perform communication with the communication partner using one of the communication carriers determined in accordance with the identifiers, if the communication unit cannot use the detected communication carrier of the communication partner.

16. The communication terminal according to claim 1, wherein the identifying information includes information showing a telephone number or an email address of the communication partner.

17. The communication terminal according to claim 5, wherein the control unit controls the communication unit to perform communication with the communication partner using one of the communication carriers determined in accordance with the identifiers, if the communication unit cannot use the detected communication carrier of the communication partner.

* * * * *